8539X
S. & C. Howard.
Making Laths.
Patented Dec. 17, 1834.
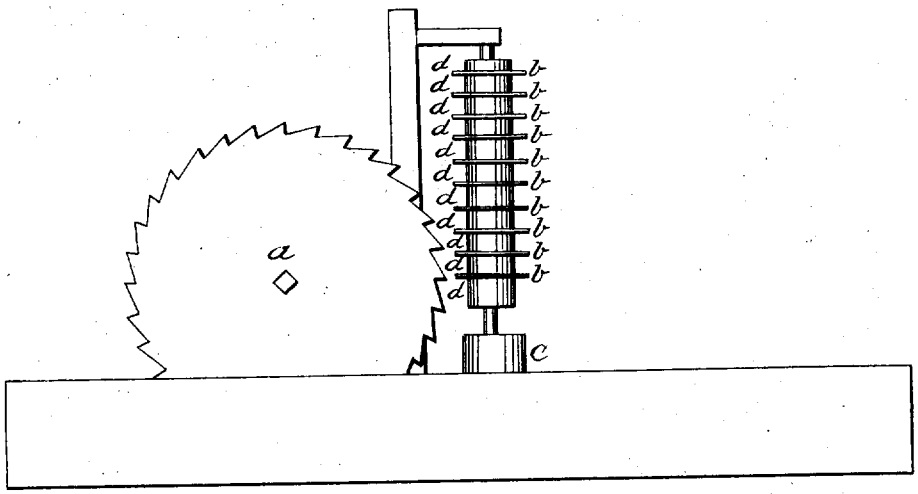
AM. PHOTO-LITHO. CO. N.Y. (OSBORNE'S PROCESS.)

Dec 17 1834

Jeba & Caleb Howard Easton Mass.

8539X

Letters Patent

The schedule referred to in these Letters Patent and making part of the same containing a description in the words of the said Jeba Howard & Caleb Howard themselves of their improvement in the Lath machine To all to whom these presents shall come. Be it known that We Jeba Howard of Easton in the County of Bristol in the State of Massachusetts and Caleb Howard of West Bridgewater in the County of Plymouth in said State have invented a new and useful improvement in the mode of placing the saws in the Lath machine so that the Laths are completed at one operation. And the following is a full and exact description thereof. The upright circular saw is hung or fixed in the usual way. Our improvement consists in placing either before or behind the upright saw one or more horizontal circular saws to be driven by a belt from the upright saw shaft or otherwise. These horizontal saws are fixed upon a perpendicular shaft having an upright frame at such distance from each other as may be necessary to saw the Lath of the necessary width or thickness. Their distance may be varied by increasing or diminishing the thickness of the collar which is placed upon the shaft between them and they may be so raised as to have them saw the edge when the upright saw cuts the side of the laths or vice versa. We claim as our invention the application of one or more horizontal saws so placed that Laths may be sawed from a block of wood at one operation as described above. We make the large upright saw about thirty inches in diameter and the horizontal saws about seven inches ~~in diameter~~. The frame upon which the block from which the Laths are to be sawed is fastened is moved up toward the saw the width or thickness of a Lath each time the carriage returns to its first position by a rack and rolling dogs in the usual way. The teeth of the saws are [illegible] so that the Lath may be sawed edgewise or flatwise as may be desired. We claim no other part of the machine than the horizontal circular saws and the fixtures necessary for their operation as described above by which Laths may be sawed complete at one operation. In testimony that the above

[illegible] Registration of marriage [illegible] Gre[illegible]
[illegible] this [illegible] day of November 1854
[illegible] Edwd Brown
[illegible] Cath. Brown
[illegible]

Drawer

[illegible]

(Chancery 1857)